(12) United States Patent
Feng et al.

(10) Patent No.: US 12,491,500 B2
(45) Date of Patent: Dec. 9, 2025

(54) CATALYST FOR $CO_2$ CAPTURE AND CONVERSION COUPLING WITH BIOMASS OXIDATION, A PREPARATION METHOD THEREFOR AND AN APPLICATION THEREOF

(71) Applicant: Beijing University of Chemical Technology, Beijing (CN)

(72) Inventors: Junting Feng, Beijing (CN); Dianqing Li, Beijing (CN); Qian Wang, Beijing (CN); Jiaxuan Fan, Beijing (CN); Xiaoxue Yue, Beijing (CN); Yufei He, Beijing (CN); Yanan Liu, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 331 days.

(21) Appl. No.: 18/074,494

(22) Filed: Dec. 4, 2022

(65) Prior Publication Data
US 2023/0191373 A1    Jun. 22, 2023

(30) Foreign Application Priority Data
Dec. 22, 2021    (CN) .......................... 202111582145.3

(51) Int. Cl.
  *B01J 27/232*    (2006.01)
  *B01D 53/14*    (2006.01)
  (Continued)

(52) U.S. Cl.
  CPC ........ *B01J 27/232* (2013.01); *B01D 53/1425* (2013.01); *B01J 21/02* (2013.01);
  (Continued)

(58) Field of Classification Search
None
See application file for complete search history.

(56) References Cited

PUBLICATIONS

Iglesias et al. ("Structural and thermal properties of Co—Cu—Fe hydrotalcite-like compounds"), Journal of Solid State Chemistry, 2005, 178, 124-152 (Year: 2005).*
(Continued)

*Primary Examiner* — Michael Forrest
*Assistant Examiner* — Nicole Lee Quist
(74) *Attorney, Agent, or Firm* — HOUTTEMAN LAW LLC

(57) ABSTRACT

The present invention discloses a catalyst for in-situ $CO_2$ capture and coupling reduction with biomass oxidation, a preparation method therefor and an application thereof. The catalyst is applied to the coupling reaction of photocatalytic $CO_2$ reduction and biomass oxidation. The preparation of the catalyst is to synthesize layered double hydroxides (LDHs) containing $CO_3^{2-}$ between layers by using coprecipitation method, hydrothermal method, sol-gel method and the like, wherein the chemical formula is $[M1-x^{2+} Mx^{3+}(OH)2]x+(An-)x/n \cdot mH_2O$, which has a thickness of 20-30 nm and an average particle diameter of 60-90 nm. Then metal ion vacancy defects are produced on LDHs laminate by using a NaOH/KOH selective etching to obtain the corresponding catalyst. The catalyst is used in photocatalytic reaction, characterized in that $CO_3^{2-}$ is continuously consumed in the reaction process, and the catalyst can absorb $CO_2$ in the air for recovery after the reaction, and can be repeatedly used to continuously consume $CO_2$ in the air, thus realizing the direct capture and effective utilization of $CO_2$.

1 Claim, 7 Drawing Sheets

(51) Int. Cl.
- *B01J 21/02* (2006.01)
- *B01J 23/00* (2006.01)
- *B01J 35/39* (2024.01)
- *B01J 35/73* (2024.01)
- *B01J 37/00* (2006.01)
- *B01J 37/04* (2006.01)
- *B01J 38/02* (2006.01)
- *B01J 38/48* (2006.01)

(52) U.S. Cl.
CPC ............ *B01J 23/007* (2013.01); *B01J 35/39* (2024.01); *B01J 35/73* (2024.01); *B01J 37/0036* (2013.01); *B01J 37/04* (2013.01); *B01J 38/02* (2013.01); *B01J 38/48* (2013.01); *B01D 2255/65* (2013.01); *B01D 2255/802* (2013.01); *B01D 2255/902* (2013.01); *B01D 2257/504* (2013.01); *B01D 2259/802* (2013.01); *B01J 2235/00* (2024.01); *B01J 2235/15* (2024.01); *B01J 2235/30* (2024.01)

(56) References Cited

PUBLICATIONS

Kannan et al ("High-temperature transformations of Cu-rich hydrotalcites") Journal of Solid State Chemistry, 2004, 177, 319-331 (Year: 2004).*

Zhao et al ("Alkali Etching of Layered Double Hydroxide Nanosheets for Enhanced Photocatalytic N2 Reduction to NH3" Supporting Information) Advanced Energy Materials, 2020, 10 (34) (Year: 2020).*

Min Zhou, et al., "Boron Carbon Nitride Semiconductors Decorated with CdS Nanoparticles for Photocatalytic Reduction of CO2", ACS Catal. 2018, 8, 6, 4928-4936.

Qianzhang, et al., "Superlattice assembly of two dimensional CoFe-LDHs nanosheets and titania nanosheets hanohybrids for high visible light photocatalytic activity", Materials Letters, 2018, 236(Feb. 1):374-377.

Ge Gao, et al., "Ultrathin magnetic Mg—Al LDH photocatalyst for enhanced CO2 reduction: Fabrication and mechanism", Journal of Colloid and Interface Science, 2019, 555:1-10.

Man Zhang, et al., "Trimetallic NiCoFe-Layered Double Hydroxides Nanosheets Efficient for Oxygen Evolution and Highly Selective Oxidation of Biomass-Derived 5-Hydroxymethylfurfural", ACS Catal. 2020, 10, 9, 5179-5189.

\* cited by examiner

CATALYST FOR CO₂ CAPTURE AND CONVERSION COUPLING WITH BIOMASS OXIDATION, A PREPARATION METHOD THEREFOR AND AN APPLICATION THEREOF

CROSS-REFERENCE TO RELATED PATENT APPLICATION

This application claims the benefit of priority to China Patent Application No. 202111582145.3, filed on Dec. 22, 2021. The entire content of the above identified application is incorporated herein by reference.

TECHNICAL FIELD

The present invention belongs to the technical field of comprehensive utilization of $CO_2$ and preparation of a catalyst, and particularly relates to a preparation method and application of a catalyst, which is used to catalyze the coupling reaction process of $CO_2$ reduction and biomass oxidation.

BACKGROUND ART

Energy is of great significance to the economic and social development. The extensive utilization of fossil fuels has caused a variety of pollution problems. Therefore, reducing the combustion of fossil energy and actively seeking new energy sources that are more environmentally friendly have become important issues that need to be solved urgently in today's society. Efficient utilization of $CO_2$ has become the focus of current research. As a green and environmentally-friendly technology, photocatalysis can reduce $CO_2$ into more valuable hydrocarbons such as carbon monoxide, methane, ethane and methanol, which is an important direction of the development of clean energy.

In order to improve the photocatalytic efficiency, many researchers would add a sacrificial agent in the reaction. In Literature 1 Boron Carbon Nitride Semiconductors Decorated with CdS Nanoparticles for Photocatalytic Reduction of $CO_2$ ACS Catal. 2018, 8, 6, 4928-4936, triethanolamine (TEOA) is used as the sacrificial agent to improve the photocatalytic performance. While $CO_2$ reduction products draw extensive attention, the utilizable value of sacrificial agent oxidation products is also worthy of attention. Biomass energy has the advantages of abundant reserves, renew-ability, low pollution, wide application, etc. Its abundant chemical bonds and functional groups can be converted into high-value products through the oxidation process. More importantly, the oxidation of hydroxyl groups in biomass is easier than that of water, and more $H^+$ can be provided for reduction reaction to accelerate the photocatalytic reaction rate.

Layered Double Hydroxides (LDHs), which is a new inorganic functional material, has attracted more and more attention and been widely used in the fields of photo-functional materials, biology, catalyst, electrochemistry, medicine, ion exchanger, etc. LDHs materials have been widely used in the field of photocatalysis. In Literature 2 Superlattice assembly of two dimensional CoFe-LDHs nanosheets and titania nanosheets nanohybrids for high visible light photocatalytic activity. Materials Letters, 2018, 236(February 1):374-377, a superlattice structured photocatalyst composed of CoFe-LDHs and titanium dioxide nanosheets is prepared and synthesized. The photocatalytic activity of the composite photocatalyst is remarkably enhanced under the irradiation of visible light. In this literature, the Co element with light response and the variable valence element Fe are introduced into the laminates of LDHs, which is conducive to the occurrence of photocatalytic reaction.

LDHs have also been extensively studied as catalysts for $CO_2$ photo-reduction. In Literature 3 Ultrathin magnetic Mg—Al LDH photocatalyst for enhanced $CO_2$ reduction: Fabrication and mechanism. Journal of Colloid and Interface Science, 2019, 555:1-10, the two-dimensional ultra-thin Mg—Al LDHs ($Fe_3O_4$/Mg—Al-LDH) modified by magnetic $Fe_3O_4$ are synthesized and used for the photocatalytic reaction. Mg—Al-LDHs could provide holes for the photocatalytic reaction. The holes could react with $H_2O$ to generate $O_2$ and protons, thus improving the photocatalytic reaction performance of $CO_2$.

In Literature 4 Trimetallic NiCoFe-Layered Double Hydroxides Nanosheets Efficient for Oxygen Evolution and Highly Selective Oxidation of Biomass-Derived 5-Hydroxymethylfurfural ACS Catal. 2020, 10, 9, 5179-5189, NiCoFe-LDHs are prepared and used in the selective oxidation of 5-hydroxymethylfurfural (5-HMF), a furan-based biomass compound. It follows that LDHs material has a wide range of applications in biomass conversion.

As a class of anionic layered two-dimensional materials, LDHs show strong affinity for $CO_3^{2-}$ ion and have excellent $CO_2$ capture and enrichment capacity in the solution environment. By taking advantage of this characteristic of LDHs and using its interlayer $CO_3^{2-}$ as the carbon source, the in-situ capture and conversion of $CO_2$ in the photocatalytic reaction can be solved simultaneously. By utilizing the capturing capacity of LDHs for $CO_2$, the catalyst is exposed in the air after each photocatalytic reaction, and stirred at room temperature to fully absorb $CO_2$ in the air for interlayer $CO_3^{2-}$ supplementation, so that the purpose of repeated use can be achieved. In addition, based on the tunability of chemical compositions of LDHs, specific photoactive metal cations could be introduced into layer. Electrons and holes are respectively captured by metal ions and hydroxyl on the surface of the layer after photo-excitation, the metal ions promote the occurrence of reduction half-reaction, and the surficial hydroxyl groups promote the occurrence of oxidation half-reaction. On this basis, the LDHs are etched to produce metal defects. Metal defects on the surface can promote the oxidation of furan biomass. Metal ions on the layer activate the reduction of $CO_3^{2-}$, and the synergistic effect of catalyst metal defects and metal ions promotes the reaction.

Therefore, the present invention selects the biomass as the sacrificial agent of the photocatalytic reaction, couples the solar-driven $CO_2$ reduction with the biomass oxidation process, and enables the directional conversion of biomass molecules to more valuable fine chemicals while improving the $CO_2$ reduction efficiency, thus realizing process innovation.

SUMMARY OF THE INVENTION

The purpose of the present invention is to provide a photocatalyst for $CO_2$ capture and conversion coupling with biomass oxidation, a preparation method therefor and an application thereof.

The chemical expression of the catalyst prepared by the invention is $CO_3^{2-}$-$M^{2+}M^{3+}$-LDHs, wherein $M^{2+}$ is one of $Mg^{2+}$, $Co^{2+}$, $Zn^{2+}$, $Mn^{2+}$, $Ni^{2+}$, and $Cu^{2+}$, and more preferably $Zn^{2+}$, $Co^{2+}$, $Ni^{2+}$, and $Cu^{2+}$; $M^{3+}$ is one of $Al^{3+}$, $Fe^{3+}$, $Cr^{3+}$, $Ce^{3+}$, $In^{3+}$, and $Ga^{3+}$, and more preferably $Al^{3+}$, $Fe^{3+}$, and $Ga^{3+}$; the molar ratio of $M^{2+}$ to $M^{3+}$ is 2-4:1; the catalyst has a two-dimensional layered structure with metal defect vacancies on the layers, and is rich in $CO_3^{2-}$ within interlayer. The $CO_3^{2-}$ of the catalyst is constantly consumed in the photocatalytic reaction. The catalyst can absorb $CO_2$ in the air for recovery after the reaction, and can be repeatedly used to continuously consume $CO_2$ in the air.

The preparation method of said catalyst: taking hydrotalcite LDHs with a thickness of 20-30 nm as a precursor, and a general formula of $[M_{1-x}^{2+}M_x^{3+}(OH)_2]^{x+}(CO_3^{2-})_{x/n}\cdot mH_2O$, wherein $M^{2+}$ is one of $Mg^{2+}$, $Co^{2+}$, $Zn^{2+}$, $Mn^{2+}$, $Ni^{2+}$, and $Cu^{2+}$, and more preferably $Zn^{2+}$, $Co^{2+}$, $Ni^{2+}$, and $Cu^{2+}$; $M^{3+}$ is one of $Al^{3+}$, $Fe^{3+}$, $Cr^{3+}$, $Ce^{3+}$, $In^{3+}$, and $Ga^{3+}$, and more preferably $Al^{3+}$, $Fe^{3+}$, and $Ga^{3+}$; the molar ratio of $M^{2+}$ to $M^{3+}$ is 2-4:1; adopting an alkali solution to etch the hydrotalcite to produce defects on the hydrotalcite layers and adjust the metal ion structure to produce oxygen vacancies, thereby promoting the reaction of photocatalytic reduction of $CO_2$. Among them, the hydrotalcite which is more suitable for photocatalyst is CuCoAl-LDHs, CuCoFe-LDHs, ZnCoFe-LDHs and CuZnGa-LDHs.

The specific method of the catalyst disclosed by the present invention is as follows:

A. Dissolve soluble metal salts $M^{2+}$ and $M^{3+}$ in deionized water to prepare a solution A, wherein the molar ratio of $M^{2+}$:$M^{3+}$ is 2-4:1, and the anion is $CO_3^{2-}$; the total concentration of $M^{2+}$ and $M^{3+}$ ions is 0.16-0.20 mol/L. $M^{2+}$ is one of $Mg^{2+}$, $Co^{2+}$, $Zn^{2+}$, $Mn^{2+}$, $Ni^{2+}$, and $Cu^{2+}$, and more preferably $Zn^{2+}$, $Co^{2+}$, $Ni^{2+}$, and $Cu^{2+}$; $M^{3+}$ is one of $Al^{3+}$, $Fe^{3+}$, $Cr^{3+}$, $Ce^{3+}$, $In^{3+}$, and $Ga^{3+}$, and more preferably $Al^{3+}$, $Fe^{3+}$, and $Ga^{3+}$;

B. Dissolve alkali and carbonate in deionized water to prepare a precipitant solution B, wherein the concentration of alkali solution is 0.1-0.2 mol/L and the concentration of carbonate is 0.25-0.35 mol/L; said alkali is NaOH or KOH, and said carbonate is $Na_2CO_3$ or $K_2CO_3$.

C. Drop equal volumes of solution A and solution B into the reactor at the same time, keep the pH of the solution at 9-11, and stir at 400-600 r/min to obtain LDHs suspension; age in a 60-80° C. water bath for 12-18 h, wash and centrifuge the suspension until neutral; and dry at 50-60° C. for 12-24 h, take it out and grind it to obtain powdered LDHs, whose chemical formula is $[M_{1-x}^{2+}M_x^{3+}(OH)_2]^{x+}(A^{n-})_{x/n}\cdot mH_2O$, with the thickness of 20-30 nm and average particle diameter of 60-90 nm.

The preferred hydrotalcite is one of CuCoAl-LDHs, CuCoFe-LDHs, ZnCoFe-LDHs, and CuZnGa-LDHs.

D. Prepare the etching solution by adding LDHs powder into the alkali etching solution so that the LDHs content in the solution is 2.3-2.8 mg/ml; etch for 1-2 h, centrifuge and wash the solution until neutral, and dry for 12-24 h at 50-60° C. to obtain a catalyst with defect points;

Said etching solution is KOH or NaOH solution with the concentration of 1-2 mol/L.

The catalyst is characterized in that metal ions on the LDHs laminate form complexes with OH– to detach from the laminate and form defect points on the laminate, thus possessing high catalytic performance.

Application of $CO_3^{2-}$-$M^{2+}M^{3+}$-LDHs Catalyst (1) Disperse $CO_3^{2-}$-$M^{2+}M^{3+}$-LDHs catalyst and biomass into acetonitrile or water to prepare a reaction solution, wherein the catalyst concentration is 0.5-1 mg/mL and the biomass concentration is 1.5-2 mg/mL; place the reaction solution in a top-illuminated stainless steel high-pressure photocatalytic reactor. Replace the air in the reactor with inert gas, control the pressure at 0.1-0.6 MPa, and irradiate it with a visible light source to make it react;

The reaction equation is:

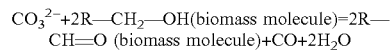

or

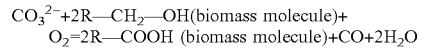

Wherein R represents a $C_xH_y$ organic functional group in a biomass molecule, and x=6-10; the catalyst is suitable for 3-hydroxybutyrolactone, glycerol, sorbitol, xylitol, 5-HMF and other hydroxyl-containing biomass molecules.

In the reaction, the catalyst generates photogenerated electrons and holes under the condition of illumination, $CO_3^{2-}$ between the catalyst layers and the photogenerated electrons generate CO through reduction reaction, hydroxyl groups in biomass molecules generate aldehyde groups through oxidation reaction with the photogenerated holes, and aldehyde further reacts with oxygen to form acid, wherein the oxygen is generated from oxidation of water by the photogenerated holes.

(2) Take out the reaction solution after 5-6 h of reaction, place it in the air and stir it at room temperature to have the catalyst recover for 12-24 h, so that the catalyst interlayer is in full contact with the air, and absorb $CO_2$ in the air to convert it into interlayer $CO_3^{2-}$ to achieve the purpose of capturing $CO_2$ in the air. The reaction between catalyst laminates is:

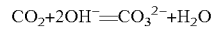

Use the recovered photocatalyst for the reaction in step (1) for a plurality of times until the biomass conversion is close to 100%, centrifuge the reaction solution from the catalyst, and separate the product from the solvent by a distillation method.

The prepared catalyst is characterized and applied. See FIG. 1-7 for the results As shown in FIG. 1, the synthesized catalyst had LDHs characteristic peaks, indicating that $CO_3^{2-}$ type CuCoAL-LDHs is successfully synthesized. After etching, the LDHs characteristic peaks become weaker and the LDHs characteristic diffraction peaks are gradually weakened. However, the positions of (003) (006) (009) and other diffraction peaks are not changed, indicating that the crystal structure of LDHs is damaged to a certain extent by etching, but the crystal structure type and interlayer spacing are not significantly changed.

As shown in SEM photograph of FIG. 2, the layered structure of the catalyst is maintained before and after the etching, and the retention of the layered structure of the catalyst after the etching can retain the capture and storage capacity of $CO_2$, serving as a good nanoreactor for $CO_2$ storage and in-situ conversion.

As shown in FIG. 3, the wavelength within the range of 200 nm to 400 nm is ultraviolet light, and the wavelength within the range of 400 nm to 760 nm is visible light. The catalyst has absorption in both the visible and ultraviolet light regions, proving that the catalyst has a large photoresponse range and is conducive to the photocatalytic reaction.

As shown in FIG. 4, the conduction band position of CoCuAl-LDHs is −0.99 eV, and the conduction band position is −0.66 eV after etching for 60 min, both of which are higher than the electrode potentials required for $CO_2$ reduction. The valence band position of CoCuAl-LDHs is 1.12 eV, and that of CoCuAl-LDHs after etching for 60 min is 0.88 eV, both of which are lower than the oxidation electromotive force of 5-HMF, indicating that the catalyst supports the $CO_2$ reduction reaction thermodynamically.

As shown in FIG. 5, the performance of the catalyst after etching is significantly improved, and the yield of CO from $CO_2$ photocatalytic reduction reaches 65.26 μmol/g.

FIG. 6 shows that the yield of the product furan-2,5-dicarboxylic acid (FDCA) reaches up to 73.6% after the catalyst is used for photocatalytic oxidation of 5-HMF.

FIG. 7 shows the performance of the etched CuCoAl-LDHs catalyst after repeated use for 5 times. The CO yield is 79.72 μmol/g, which is 80.5% of that in the initial use and still has stability.

The beneficial effects of the invention: the catalyst prepared by the invention is used in the field of coupling the photocatalytic reduction of $CO_2$ with molecular oxidation of biomass; the defects on the LDHs layer promote the full contact between the biomass molecules and the interlayer carbonate and accelerate the reaction process. The catalyst utilizes the characteristics of LDHs that OH– between LDHs layers can adsorb $CO_2$ in the air, so that the catalyst can be supplemented by a carbon source from the air, and the catalyst is recovered in the air to achieve the purpose of repeated use.

DETAILED DESCRIPTION OF THE PREFERRED EMBODIMENTS

Embodiment 1

Figure 1:
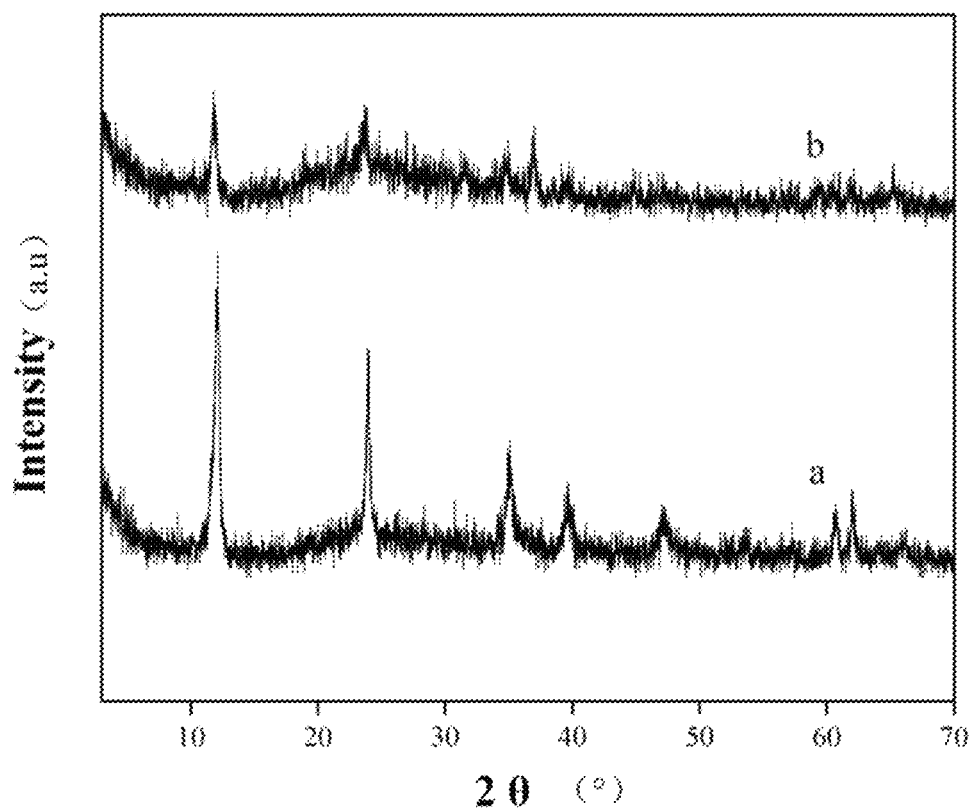
FIG. 1 shows the XRD diffraction pattern of CuCoAl-LDHs prepared in embodiment 1 before and after etching, wherein a is the unetched CuCoAl-LDHs, and b is the etched CuCoAl-LDHs.
Figure 2:
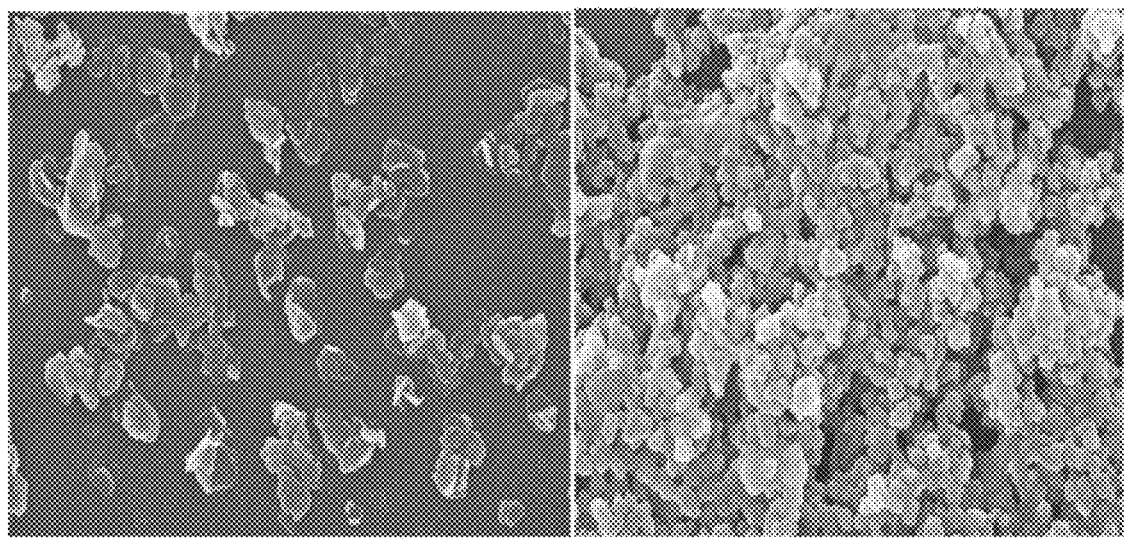
FIG. 2 shows the scanning electron microscope (SEM) photograph of CuCoAl-LDHs prepared in embodiment 1 before and after etching, wherein a is unetched CuCoAl-LDHs, and b is etched CuCoAl-LDHs.
Figure 3:
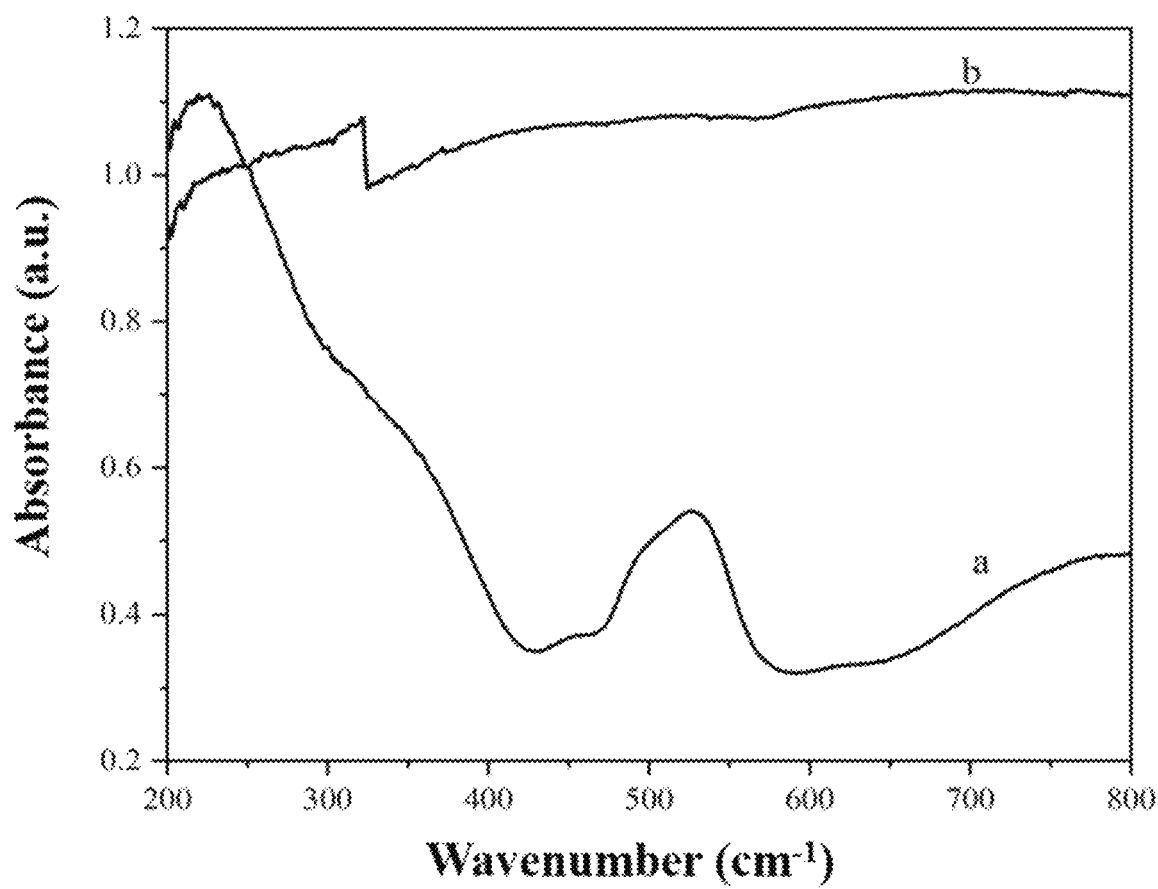
FIG. 3 shows the solid UV diffuse reflection spectrum of CuCoAl-LDHs prepared in embodiment 1 before and after etching, wherein a is the unetched CuCoAl-LDHs, and b is the etched CuCoAl-LDHs.
Figure 4:
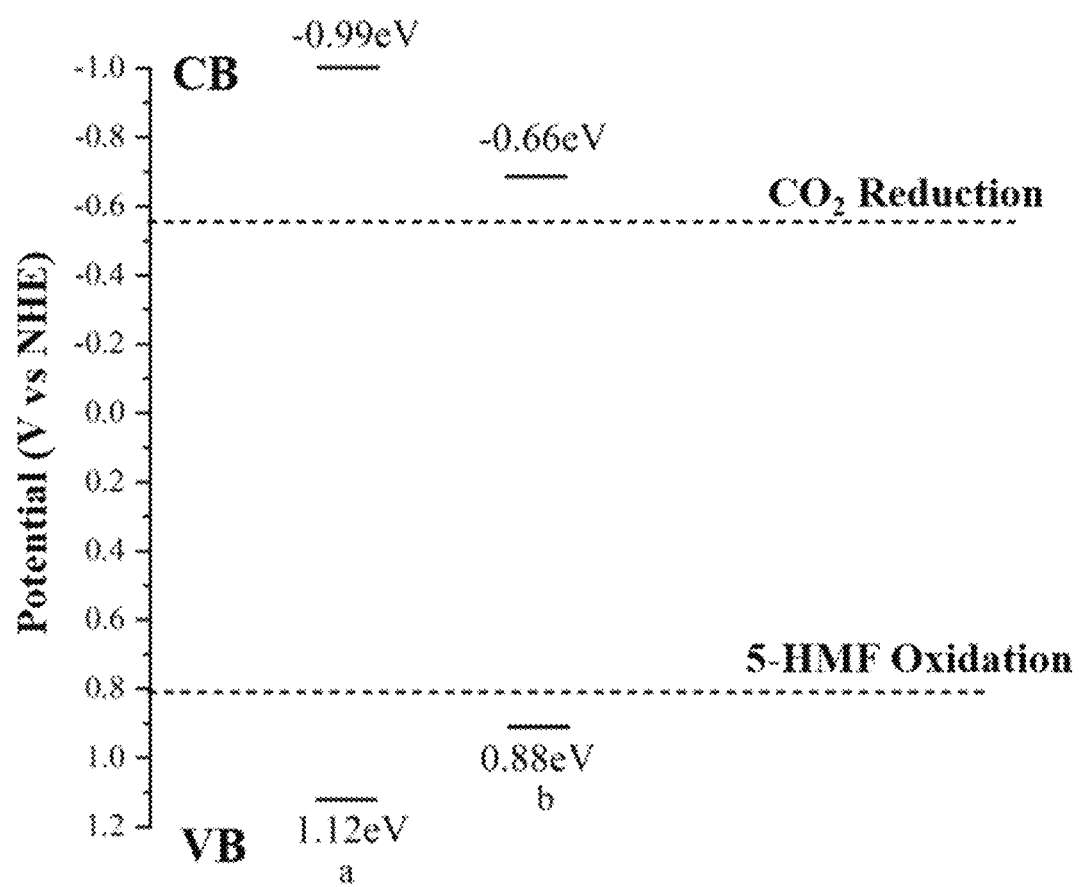
FIG. 4 shows the energy band positions of the catalyst prepared in embodiment 1.

A: Weigh 0.002 mol of $Cu(NO_3)_2 \cdot 6H_2O$ solid, 0.01 mol of $Co(NO_3)_2 \cdot 6H_2O$ solid, and 0.006 mol of $Al(NO_3)_3 \cdot 9H_2O$ solid and dissolve them in a beaker containing 100 mL of deionized water.

B: Weigh 0.03 mol of anhydrous $Na_2CO_3$ solid and 0.015 mol of NaOH solid and dissolve them in a beaker containing 100 mL of deionized water.

C: Add 100 mL of deionized water into the three-necked flask, and titrate the two liquid solutions in Steps A and B into the flask at the same titration rate, keeping the pH in the titration process within the range of 9-11. After the dropwise addition, place the three-necked flask in a 60° C. water bath for crystallization for 12 hours, followed by centrifugating, washing, drying and grinding to obtain CuCoAl-LDHs.

D: Take 0.1 g of CuCoAl-LDHs sample, add 40 mL of 1 mol/L KOH solution and have it etched in a 60° C. water bath for 1 hour, followed by centrifugating, washing to neutrality, drying and grinding to obtain catalyst CuCoAl-LDHs with defect points.

Embodiment 2

A: Weigh 0.002 mol of $Cu(NO_3)_2 \cdot 6H_2O$ solid, 0.01 mol of $Co(NO_3)_2 \cdot 6H_2O$ solid, and 0.006 mol of $Fe(NO_3)_3 \cdot 9H_2O$ solid. Dissolve the three salts in a beaker containing 100 mL of deionized water.

B: Weigh 0.03 mol of anhydrous $Na_2CO_3$ solid and 0.015 mol of NaOH solid and dissolve them in a beaker containing 100 mL of deionized water.

C: Add 100 mL of deionized water into the three-necked flask, and titrate the two liquid solutions in Steps A and B into the flask at the same titration rate, keeping the pH in the titration process within the range of 9-11, and then have the solution crystallize in a water bath at 60° C. for 12 hours, followed by centrifuging, washing, drying and grinding to obtain CuCoFe-LDHs.

D: Take 0.1 g of CuCoFe-LDHs sample, add 40 mL of 1 mol/L KOH solution and have it etched in a 60° C. water bath for 1 hour, followed by centrifugating, washing to neutrality, drying and grinding to obtain photocatalyst CuCoFe-LDHs with high catalytic performance.

Embodiment 3

A: Weigh 0.002 mol of $Zn(NO_3)_2 \cdot 6H_2O$ solid, 0.01 mol of $Co(NO_3)_2 \cdot 6H_2O$ solid, and 0.006 mol of $Fe(NO_3)_3 \cdot 9H_2O$ solid. Dissolve the three salts in a beaker containing 100 mL of deionized water.

B: Weigh 0.03 mol of anhydrous $Na_2CO_3$ solid and 0.015 mol of NaOH solid and dissolve them in a beaker containing 100 mL of deionized water.

C: Synthesize ZnCoFe-LDHs by coprecipitation method; add 100 mL of deionized water into the three-necked flask, and titrate the two liquid solutions in Steps A and B into the 500 mL flask at the same titration rate, keeping the pH in the titration process within the range of 9-11, and then have the solution crystallize in a water bath at 60° C. for 12 hours, followed by centrifuging, washing, drying and grinding to obtain ZnCoFe-LDHs.

D: Take 0.2 g of ZnCoFe-LDHs sample, add 40 mL of 2 mol/L KOH solution and have it etched in a 60° C. water bath for 2 hours, followed by centrifugating, washing to neutrality, drying and grinding to obtain photocatalyst with high catalytic performance.

Application of Catalyst

Embodiment 4

A: Weigh 0.002 mol of $Cu(NO_3)_2 \cdot 6H_2O$ solid, 0.01 mol of $Zn(NO_3)_2 \cdot 6H_2O$ solid, and 0.006 mol of $Ga(NO_3)_3 \cdot 9H_2O$ solid. Dissolve the three salts in a beaker containing 100 mL of deionized water.

B: Weigh 0.03 mol of anhydrous $Na_2CO_3$ solid and 0.015 mol of NaOH solid and dissolve them in a beaker containing 100 mL of deionized water.

C: Synthesize CuZnGa-LDHs by coprecipitation method; add 100 mL of deionized water into the three-necked flask, and titrate the two liquid solutions in Steps A and B into the 500 mL flask at the same titration rate, keeping the pH in the titration process within the range of 9-11, and then have the solution crystallize in a water bath at 60° C. for 12 hours, followed by centrifuging, washing, drying and grinding to obtain CuZnGa-LDHs.

D: Take 0.2 g of CuZnGa-LDHs sample, add 40 mL of 2 mol/L KOH solution and have it etched in a 60° C. water bath for 2 hours, followed by centrifugating, washing to neutrality, drying and grinding to obtain photocatalyst with high catalytic performance.

Application Example

Figure 5:
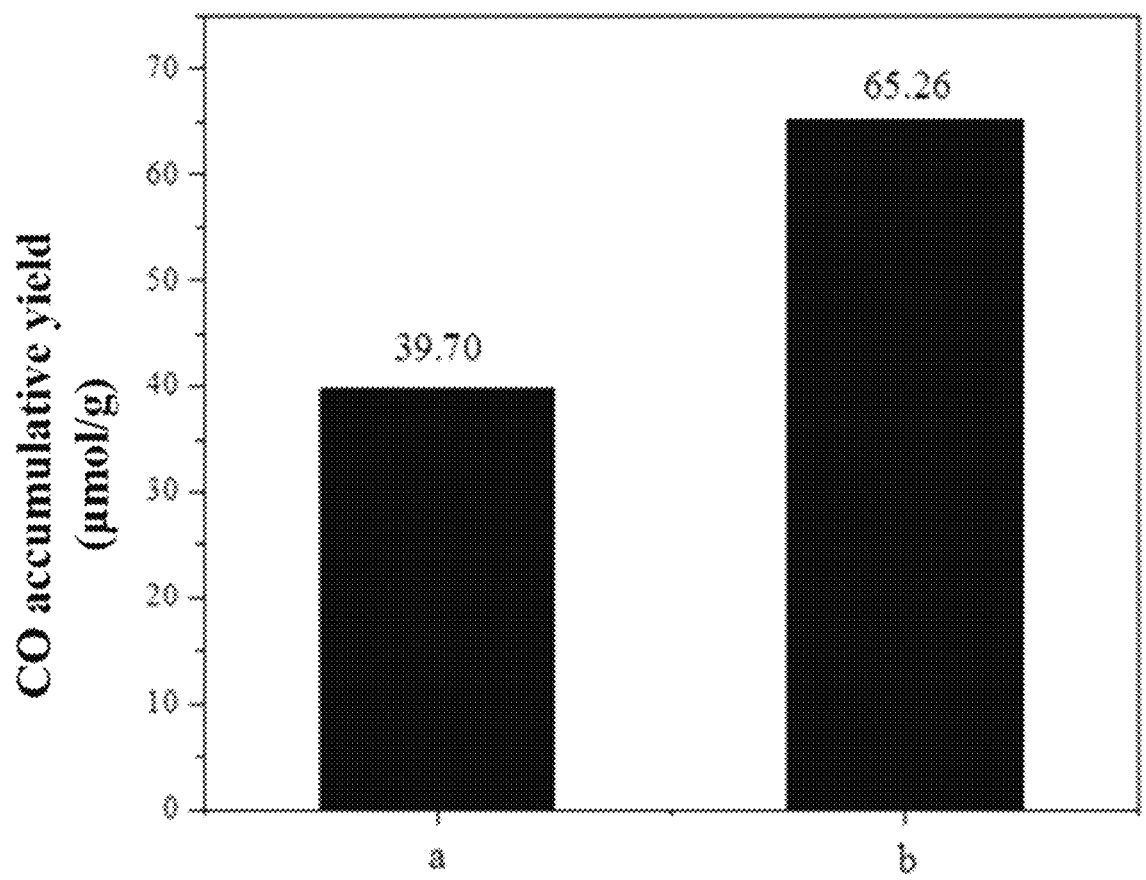
FIG. 5 shows the catalytic performance of CuCoAl-LDHs prepared in embodiment 1 before and after etching according to the conditions of the application example, wherein a is unetched CuCoAl-LDHs, and b is etched CuCoAl-LDHs.
Figure 6:
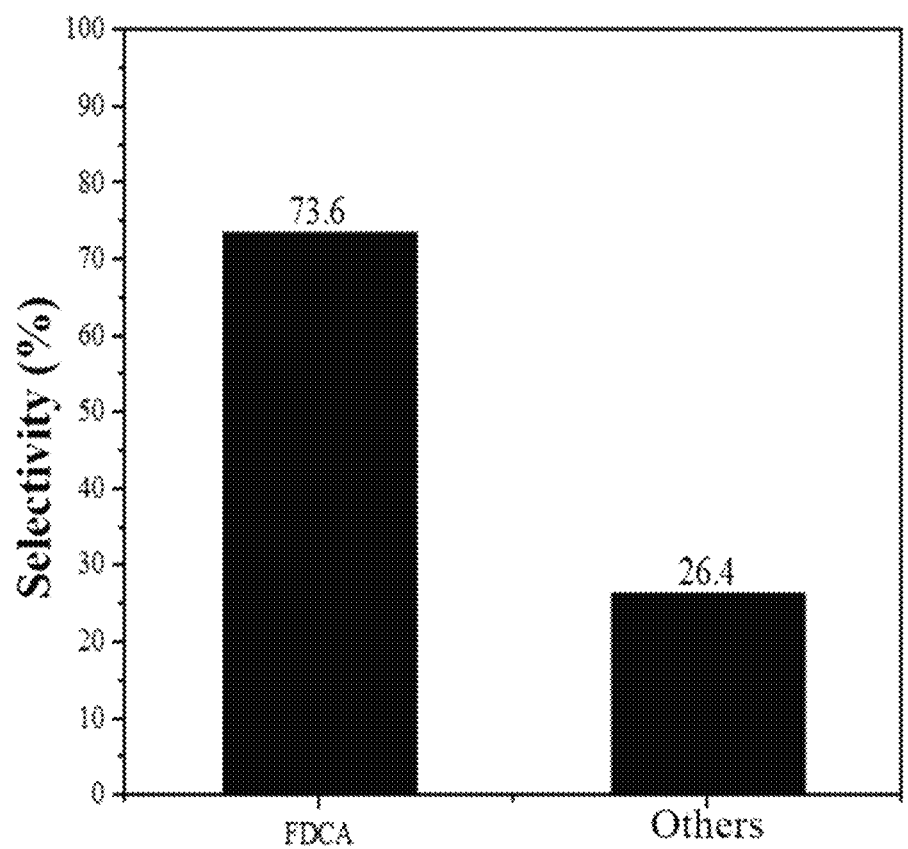
FIG. 6 shows the yield of the catalyst prepared in embodiment 1 for 6 hours after photocatalytic oxidation of 5-HMF oxidation according to the conditions of the application example.
Figure 7:
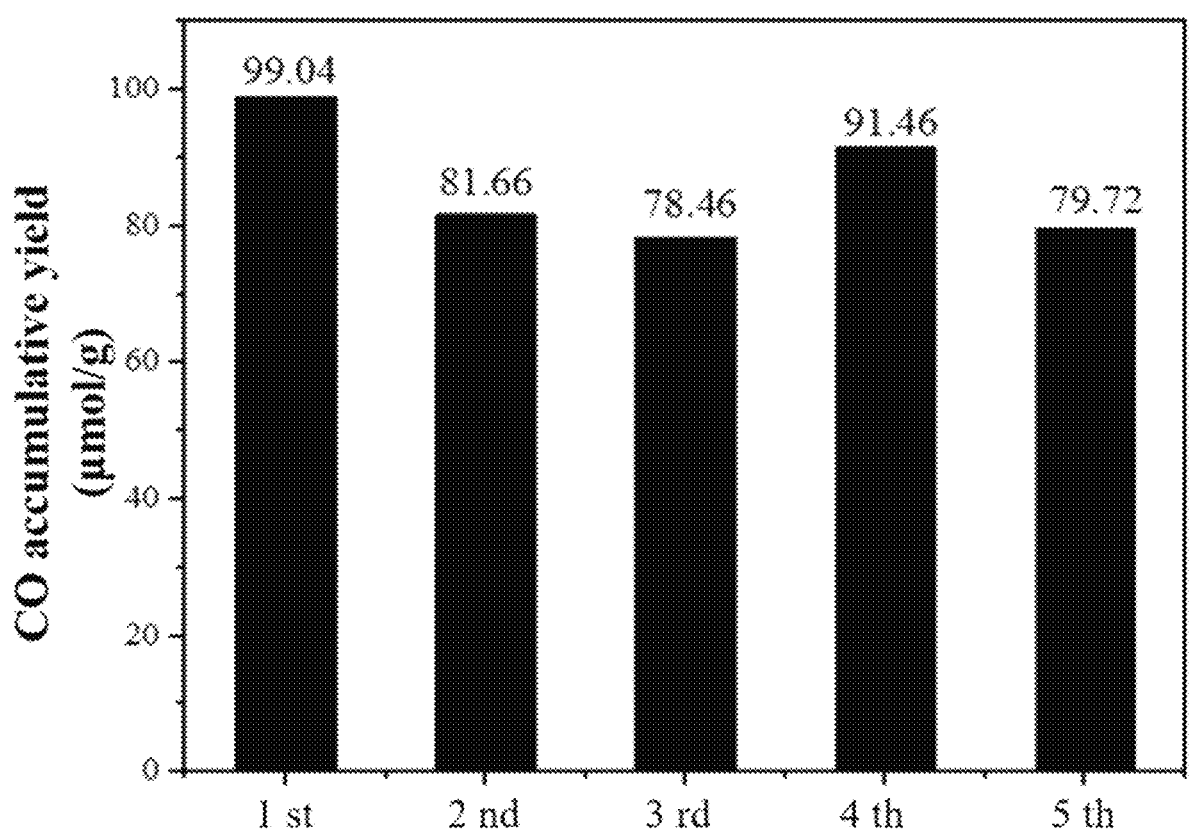
FIG. 7 shows the cumulative yield of the catalyst prepared in embodiment 1 for 30 hours after repeated use of photocatalytic 5-HMF according to the conditions of the application example.

The catalysts prepared in embodiments 1-4 are used separately in the coupling reaction of photocatalytic $CO_2$ reduction and 5-HMF oxidation:

The reaction condition are as follows: put 30 mg of catalyst powder, 120 mg of 5-HMF and 60 mL of acetonitrile solution into a top-illuminated reactor, screw up the reactor and inject inert gas to displace the air in the device, close the outlet valve and inject inert gas to enable the pressure in the reactor reach 0.2 MPa, seal the reaction system, and have it stand for a period of time to observe whether the reactor leaks air. Under the condition that the airtightness of the reactor is good, turn on the 300 W Xe lamp to irradiate the reaction. After the reaction starts, take 1 mL of gas with a stainless steel gas-tight syringe at an interval of 1 h and inject it into gas chromatography for detection. The reaction activity of the catalyst is evaluated by detecting the concentration of the product in the gas. The contents of CO, $CH_4$ and $H_2$ in the gas are mainly tested. FIG. 5 shows the test results of embodiment 1.

Take out the reactor liner after 6 h of reaction, and stir it in the air at room temperature for 12 h to make the catalyst fully absorb $CO_2$ in the air. After the catalyst recovers, repeat the photocatalytic reaction for five times, and take out the reaction solution. After centrifugation, use liquid chromatography to quantitatively analyze the products. The results are shown in Table 1.

TABLE 1

| Sample | Cumulative CO yield μmol/g | FDCA yield % |
| --- | --- | --- |
| Embodiment 1 | 326.3 | 74.1 |
| Embodiment 2 | 312.9 | 73.1 |
| Embodiment 3 | 298.2 | 71.5 |
| Embodiment 4 | 312.2 | 72.2 |

As shown in Table 1, the cumulative CO yield is 298-326 μmol/g, while the yield of the 5-HMF oxidation product, furan-2,5-dicarboxylic acid (FDCA), is 71.5-74.1%.

What is claimed is:

1. A preparation method of a catalyst for $CO_2$ capture and coupling conversion with biomass oxidation, characterized in that the preparation method comprises the following steps:
   A. dissolve soluble metal salts $M^{2+}$ and $M^{3+}$ in deionized water to prepare a solution A, wherein the molar ratio of $M^{2+}:M^{3+}$ is 2-4:1, and the anion is $CO_3^{2-}$; the total concentration of $M^{2+}$ and $M^{3+}$ ions is 0.16-0.20 mol/L; $M^{2+}$ is one or more selected from $Zn^{2+}$, $Co^{2+}$, $Ni^{2+}$ and $Cu^{2+}$; $M^{3+}$ is one of $Al^{3+}$, $Fe^{3+}$ and $Ga^{3+}$;
   B. dissolve alkali and carbonate in deionized water to prepare a precipitant solution B, wherein the concentration of alkali in the precipitant solution is 0.1-0.2 mol/L and the concentration of carbonate is 0.25-0.35 mol/L; said alkali is NaOH or KOH, and said carbonate is $Na_2CO_3$ or $K_2CO_3$;
   C. drop equal volumes of solution A and solution B into the reactor at the same time, keep the pH of the solution at 9-11, and stir at 400-600 r/min to obtain a layered double hydroxides (LDHs) suspension; age in a 60-80° C. water bath for 12-18 h, wash and centrifuge the LDHs suspension until neutral; dry at 50-60° C. for 12-24 h, take it out and grind it to obtain a LDHs powder, whose chemical formula is $[M_{1-x}^{2+}M_x^{3+}(OH)_2]^{x+}(A^{n-})_{x/n} \cdot mH_2O$; the axial dimension of the LDHs in the LDHs powder is 20-30 nm;
   D. perform an etching step by adding the LDHs powder into an etching solution so that the LDHs content in the solution is 2.3-2.8 mg/ml; etch for 1-2 h, centrifuge and wash the solution until neutral, and dry for 12-24 h at 50-60° C. to obtain a catalyst with defect points;
   said etching solution is KOH or NaOH solution with the concentration of 1-2 mol/L;
   wherein the LDHs prepared in step C is one of CuCoAl-LDHs, CuCoFe-LDHs, ZnCoFe-LDHs and CuZnGa-LDHs.

* * * * *